United States Patent
Iwamura et al.

(10) Patent No.: US 7,209,572 B2
(45) Date of Patent: Apr. 24, 2007

(54) DIGITAL WATERMARK EMBEDDING APPARATUS, DIGITAL WATERMARK EXTRACTION APPARATUS, AND METHODS THEREOF

(75) Inventors: Keiichi Iwamura, Kanagawa (JP); Kitahiro Kaneda, Kanagawa (JP); Jun Tamaru, Tokyo (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 10/456,534

(22) Filed: Jun. 9, 2003

(65) Prior Publication Data

US 2003/0231786 A1    Dec. 18, 2003

(30) Foreign Application Priority Data

Jun. 18, 2002  (JP)  ............................. 2002-177645

(51) Int. Cl.
*H04K 1/00* (2006.01)
(52) U.S. Cl. ......................................... 382/100; 380/54
(58) Field of Classification Search ................ 382/100, 382/232; 380/51, 54, 55; 713/176; 715/530, 715/531, 539
See application file for complete search history.

(56) References Cited

U.S. PATENT DOCUMENTS

| 5,600,720 A |   | 2/1997  | Iwamura et al. .............. 380/1 |
|---|---|---|---|
| 5,629,770 A |   | 5/1997  | Brassil et al. ............. 358/261.1 |
| 5,666,419 A |   | 9/1997  | Yamamoto et al. ........... 380/28 |
| 5,680,479 A |   | 10/1997 | Wang et al. ................. 382/176 |
| 5,761,686 A | * | 6/1998  | Bloomberg ................. 707/529 |
| 5,861,619 A |   | 1/1999  | Horino et al. ............... 235/470 |
| 5,937,395 A |   | 8/1999  | Iwamura ..................... 705/30 |
| 6,086,706 A |   | 7/2000  | Brassil et al. ................ 156/277 |
| 6,088,454 A |   | 7/2000  | Nagashima et al. .......... 380/49 |
| 6,425,081 B1 |  | 7/2002  | Iwamura ...................... 713/176 |
| 6,535,616 B1 |  | 3/2003  | Hayashi et al. ............. 382/100 |
| 6,560,339 B1 |  | 5/2003  | Iwamura ...................... 380/201 |
| 2001/0012019 A1 | | 8/2001 | Yamazaki et al. .......... 345/639 |
| 2001/0017709 A1 | | 8/2001 | Murakmi et al. ........... 358/1.14 |

(Continued)

FOREIGN PATENT DOCUMENTS

JP            6-68301 A        3/1994

(Continued)

OTHER PUBLICATIONS

Brassil et al., "Electronic Marking and Identification Techniques to Discourage Document Copying," IEEE Proc. INFOCOM'94, Jun. 1994, pp. 1278-1287.*

(Continued)

*Primary Examiner*—Andrew W. Johns
(74) *Attorney, Agent, or Firm*—Fitzpatrick, Cella, Harper & Scinto

(57) ABSTRACT

A document image undergoes document analysis to obtain circumscribing rectangles of characters (S601), and two distances between non-neighboring circumscribing rectangles from the head of the document are respectively calculated as d1 and d2 (S603). If information to be embedded is 1, one or a combination of a process for changing a parameter associated with the size of a circumscribing rectangle and a process for changing a parameter associated with the position of a circumscribing rectangle is executed to satisfy d1>d2 (S605). If information to be embedded is 0, one or a combination of the above two parameter change processes is executed to satisfy d1<d2 (S606).

18 Claims, 10 Drawing Sheets

U.S. PATENT DOCUMENTS

| | | | |
|---|---|---|---|
| 2001/0017717 A1 | 8/2001 | Ishida et al. | 358/464 |
| 2001/0054146 A1* | 12/2001 | Carro et al. | 713/171 |
| 2002/0002679 A1 | 1/2002 | Murakami et al. | 713/176 |
| 2002/0013794 A1* | 1/2002 | Carro et al. | 707/534 |
| 2002/0055390 A1 | 5/2002 | Mizukoshi et al. | 464/111 |
| 2002/0060736 A1 | 5/2002 | Wakao et al. | 348/207 |
| 2002/0104003 A1 | 8/2002 | Iwamura | 713/176 |
| 2002/0133705 A1 | 9/2002 | Tagashira et al. | 713/176 |
| 2003/0012406 A1 | 1/2003 | Iwamura | 382/100 |
| 2003/0044043 A1 | 3/2003 | Kaneda | 382/100 |
| 2003/0101141 A1 | 5/2003 | Iwamura | 705/51 |
| 2003/0149936 A1* | 8/2003 | Tamaru | 715/515 |
| 2004/0022411 A1* | 2/2004 | Tamaru et al. | 382/100 |

FOREIGN PATENT DOCUMENTS

| | | |
|---|---|---|
| JP | 9-186603 A | 7/1997 |
| JP | 3136061 B2 | 12/2000 |

OTHER PUBLICATIONS

Brassil et al., "Electronic Marking and Identification Techniques to Discourage Document Copying," IEEE Journal on Selected Areas in Communications, vol. 13, No. 8, Oct. 1995, pp. 1495-1504.*

Huang et al., "Interword Distance Changes Represented by Sine Waves for Watermarking Text Images," IEEE Transactions on Circuits and Systems for Video Technology, vol. 11, No. 12, Dec. 2001, pp. 1237-1245.*

Nopporn Chotikakamthorn, King Mongkut Institute of Technology, "Electronic Document Data Hiding Technique Using Inter-Character Space", The 1998 IEEE Asia-Pacific Conf. On Circuits and Systems, 1998, pp. 419-422.

Yasuhiro Nakamura & Kineo Matsui, "Digital Watermarking onto Japanese Documents by Seal Image", IPSJ Journal vol. 38, No. 11, Nov. 1997 (including English Abstract), pp. 2356-2361.

* cited by examiner

DIGITAL WATERMARK EMBEDDING APPARATUS, DIGITAL WATERMARK EXTRACTION APPARATUS, AND METHODS THEREOF

FIELD OF THE INVENTION

The present invention relates to a digital watermark embedding apparatus for embedding a digital watermark in a document image, a digital watermark extraction apparatus for extracting a digital watermark from a document image embedded with the digital watermark, and methods thereof.

BACKGROUND OF THE INVENTION

As a copyright protection method upon distributing digital data such as image data, audio data, and the like on the Internet, digital watermarking attracts a lot of attention. Digital watermarking is a technique for embedding information so as to be imperceptible to a human being. For example, as a digital watermarking technique for a multi-valued image, various methods that exploit the redundancy of the density values of multi-valued pixels are known.

On the other hand, a binary image such as a document image has small redundancy, and it is difficult to apply the digital watermarking technique to such image. However, some digital watermarking methods that exploit unique features of document images are known. For example, ① a method of shifting the baseline of a line (Japanese Patent No. 3,136,061=U.S. Pat. Nos. 5,629,770 and 6,086,706), ② a method of manipulating an inter-word space length (U.S. Pat. No. 6,086,706, Japanese Patent Laid-Open No. 9-186603=U.S. Pat. No. 5,861,619), ③ a method of manipulating an inter-character space length (King Mongkut Institute of Technology, "Electronic Document Data Hiding Technique Using Inter-Character Space", The 1998 IEEE Asia-Pacific Conf. On Circuits and Systems, 1998, pp. 419–422), ④ a method of rotating a character to change a slope (Yasuhiro Nakamura & Kineo Matsui, "Digital Watermarking onto Japanese Documents by Seal Image", IPSJ Journal Vol. 38, No. 11, November 1997), and the like are known.

However, since a document image has small redundancy, and the conventional methods proposed so far embed information by changing two variables, i.e., the baseline of a line, inter-word space, or rotation of a character, the changed points stand out, i.e., image quality deteriorates considerably.

The present invention has been made in consideration of the aforementioned problems, and has as its object to provide a digital watermark embedding apparatus and method, which can reduce deterioration of the image quality of a document image embedded with digital watermark information.

SUMMARY OF THE INVENTION

According to the present invention, the foregoing object is attained by providing a digital watermark embedding apparatus for embedding digital watermark information in a document image, comprising:

circumscribing rectangle calculation means for calculating circumscribing rectangles of respective characters which form the document image;

distance calculation means for calculating a first distance between circumscribing rectangles in a first pair as a pair of non-neighboring two circumscribing rectangles, and a second distance between circumscribing rectangles in a second pair different from the first pair; and control means for controlling any of characters which form the first or second pair so as to change a comparison result between the first and second distances in accordance with the digital watermark information.

According to the present invention, the foregoing object is attained by providing a digital watermark embedding apparatus for embedding digital watermark information in a document image, comprising:

circumscribing rectangle calculation means for calculating circumscribing rectangles of respective characters which form the document image;

average value calculation means for calculating an average value of distances each between non-neighboring two circumscribing rectangles; and control means for controlling at least one character to change the distance between non-neighboring two circumscribing rectangles with respect to the average value in accordance with the digital watermark information.

According to the present invention, the foregoing object is attained by providing a digital watermark embedding apparatus for embedding digital watermark information in a document image, comprising:

circumscribing rectangle calculation means for calculating circumscribing rectangles of respective characters which form the document image; and embedding means for embedding digital watermark information using a distance between non-neighboring two circumscribing rectangles, and correcting a change in distance between a predetermined number of circumscribing rectangles, which change takes place upon embedding.

According to the present invention, the foregoing object is attained by providing a digital watermark embedding method for embedding digital watermark information in a document image, comprising:

a circumscribing rectangle calculation step of calculating circumscribing rectangles of respective characters which form the document image;

a distance calculation step of calculating a first distance between circumscribing rectangles in a first pair as a pair of non-neighboring two circumscribing rectangles, and a second distance between circumscribing rectangles in a second pair different from the first pair; and a control step of controlling any of characters which form the first or second pair so as to change a comparison result between the first and second distances in accordance with the digital watermark information.

According to the present invention, the foregoing object is attained by providing a digital watermark embedding method for embedding digital watermark information in a document image, comprising:

a circumscribing rectangle calculation step of calculating circumscribing rectangles of respective characters which form the document image;

an average value calculation step of calculating an average value of distances each between non-neighboring two circumscribing rectangles; and a control step of controlling at least one character to change the distance between non-neighboring two circumscribing rectangles with respect to the average value in accordance with the digital watermark information.

According to the present invention, the foregoing object is attained by providing a digital watermark embedding method for embedding digital watermark information in a document image, comprising:

a circumscribing rectangle calculation step of calculating circumscribing rectangles of respective characters which form the document image; and an embedding step of embedding digital watermark information using a distance between non-neighboring two circumscribing rectangles, and correcting a change in distance between a predetermined number of circumscribing rectangles, which change takes place upon embedding.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 2:
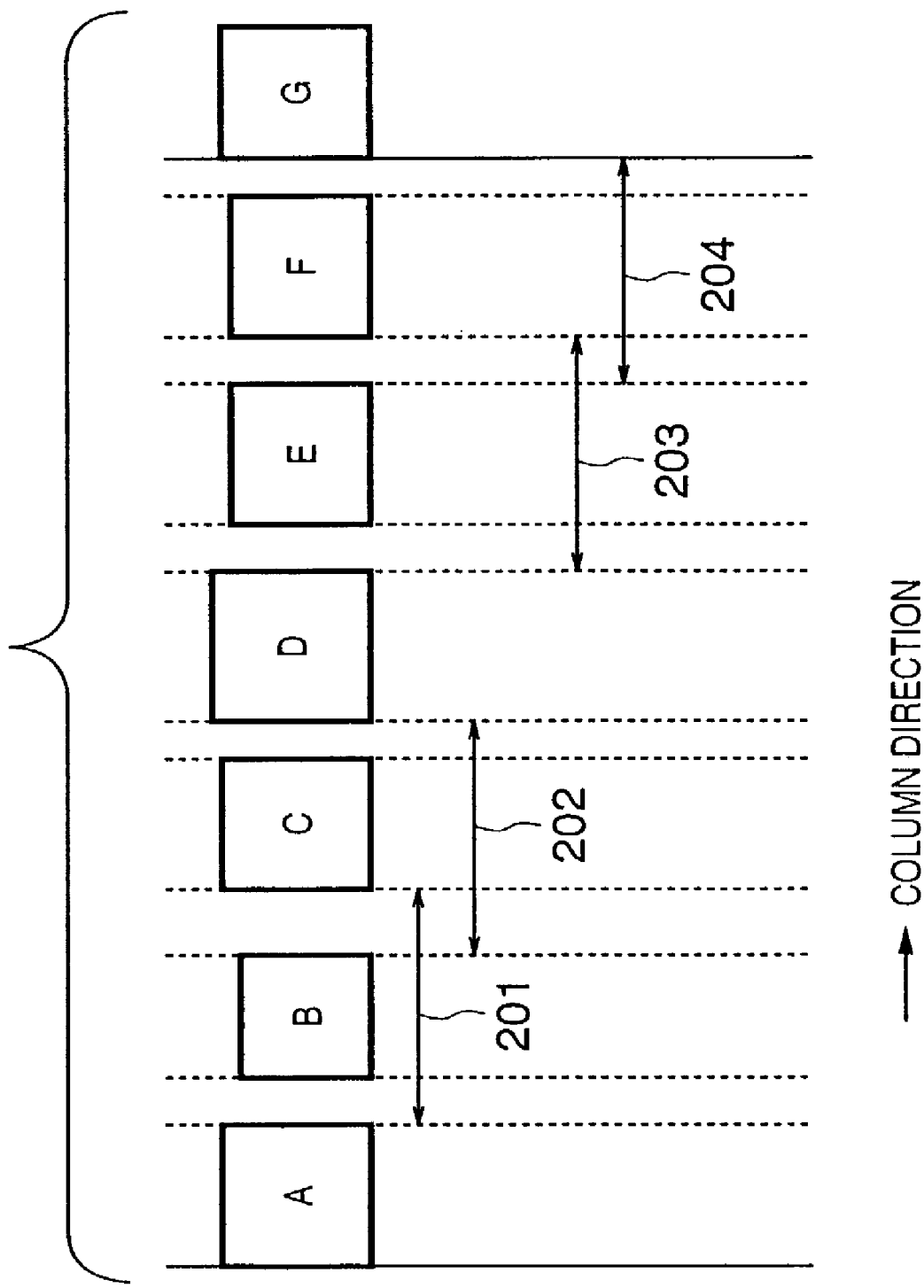
FIG. 2 is a view for explaining a digital watermark information embedding method according to the first embodiment of the present invention, which uses the distances between non-neighboring circumscribing rectangles of respective characters in a document image.

A digital watermark information embedding method according to this embodiment will be described below using FIG. 2. FIG. 2 is a view for explaining a digital watermark information embedding method according to this embodiment, which uses the distances between non-neighboring circumscribing rectangles of respective characters in a document image.

Rectangles A to G indicate circumscribing rectangles of characters, and are extracted using a document analysis technique. The circumscribing rectangle of each character is a rectangle that circumscribes a character, and information indicating a region which is to undergo character recognition. As a method of obtaining circumscribing rectangles of characters, the pixel values of a document image are mapped on the vertical coordinate axis to segment the document image into lines by searching for blank portions (portions where no black characters are present), and determining lines. After that, the document image is mapped on the horizontal coordinate axis for each line to search for blank portions, thus segmenting the line into characters. In this way, respective characters can be extracted as circumscribing rectangles. As this method, a method disclosed in, e.g., Japanese Patent Laid-Open No. 6-68301 (U.S. Pat. No. 5,680,479) is available.

In FIG. 2, reference numeral 201 denotes a distance between circumscribing rectangles A and C; 202, a distance between circumscribing rectangles B and D; 203, a distance between circumscribing rectangles D and F; and 204, a distance between circumscribing rectangles E and G. As described above, the digital watermark information embedding method according to this embodiment changes these distances in accordance with digital watermark information to be embedded.

Figure 3:
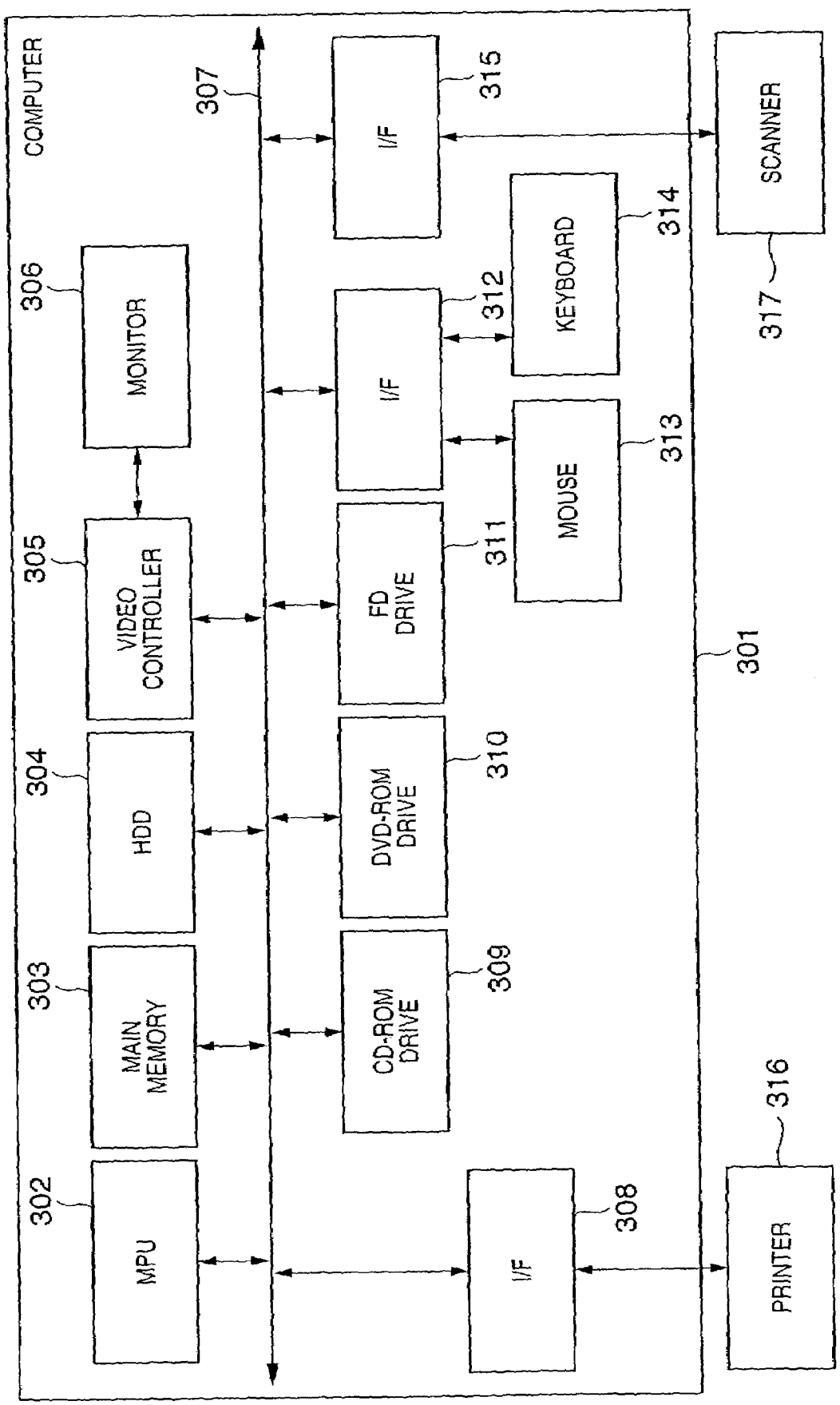
FIG. 3 is a block diagram showing the basic arrangement of a computer which serves as a digital watermark embedding apparatus and digital watermark extraction apparatus according to an embodiment of the present invention.

The digital watermark information embedding method will be described below. FIG. 3 shows the basic arrangement of a computer which serves as a digital watermark embedding apparatus according to this embodiment, and also a digital watermark extraction apparatus for extracting digital watermark information from a document image embedded with the digital watermark information. Note that use of all blocks shown in FIG. 3 is not indispensable to implement the embedding and extraction methods.

Referring to FIG. 3, a computer 301 is a prevalent personal computer or workstation, and can receive, edit, and save an image scanned by a scanner 317. Also, the computer 301 can print an image scanned by the scanner 317 on a print medium such as a paper sheet, OHP sheet, or the like using a printer 316. Note that various user's instructions can be input using a mouse 313 and keyboard 314.

In the computer 301, respective blocks to be described below are connected via a bus 307 and can exchange various data. An MPU 302 controls the operations of respective blocks in the computer 301, and executes a series of processes associated with embedding of digital watermark information (to be described later) and a series of processes for extracting digital watermark information embedded in a document image by this embedding process, by executing a program stored in a main memory 303 which comprises a RAM.

The main memory 303 comprises an area for temporarily storing programs and data loaded from an HDD 304, CD-ROM drive 309, DVD-ROM drive 310, FD drive 311, and the like, and also a work area for temporarily storing data to be processed when the MPU 302 executes various processes.

The hard disk drive (HDD) 304 can pre-store programs and document image data to be loaded onto the main memory 303, and can store processed document image data. An interface (I/F) 315 is connected to the scanner 317, which scans information recorded on a document, film, or the like, and generates image data, and is used to input image data scanned by the scanner 317. An I/F 308 is connected to the printer 316 which prints image data, and transmits image data to be printed to the printer 316.

The CD-ROM drive 309 can read out data stored in a CD-ROM (CD-R/CD-RW) as one of external storage media, and can write data on the CD-R/CD-RW. The FD (floppy®) disk) drive 311 can read out data from an FD and can write data on the FD as in the CD-ROM drive 309. The DVD-ROM drive 310 can read out data from a DVD and can write data on the DVD as in the FD drive 311. When programs or printer drivers are stored in the CD-ROM, FD, DVD-ROM, and the like, these programs are installed on the HDD 304, and are loaded onto the main memory 303 as needed.

An I/F 312 is connected to the mouse 313 and keyboard 314 to receive input instructions from them. A monitor 306 is a display device which can display an extraction process result and history of digital watermark information. Furthermore, a video controller 305 transmits display data to the monitor 306.

Figure 6:
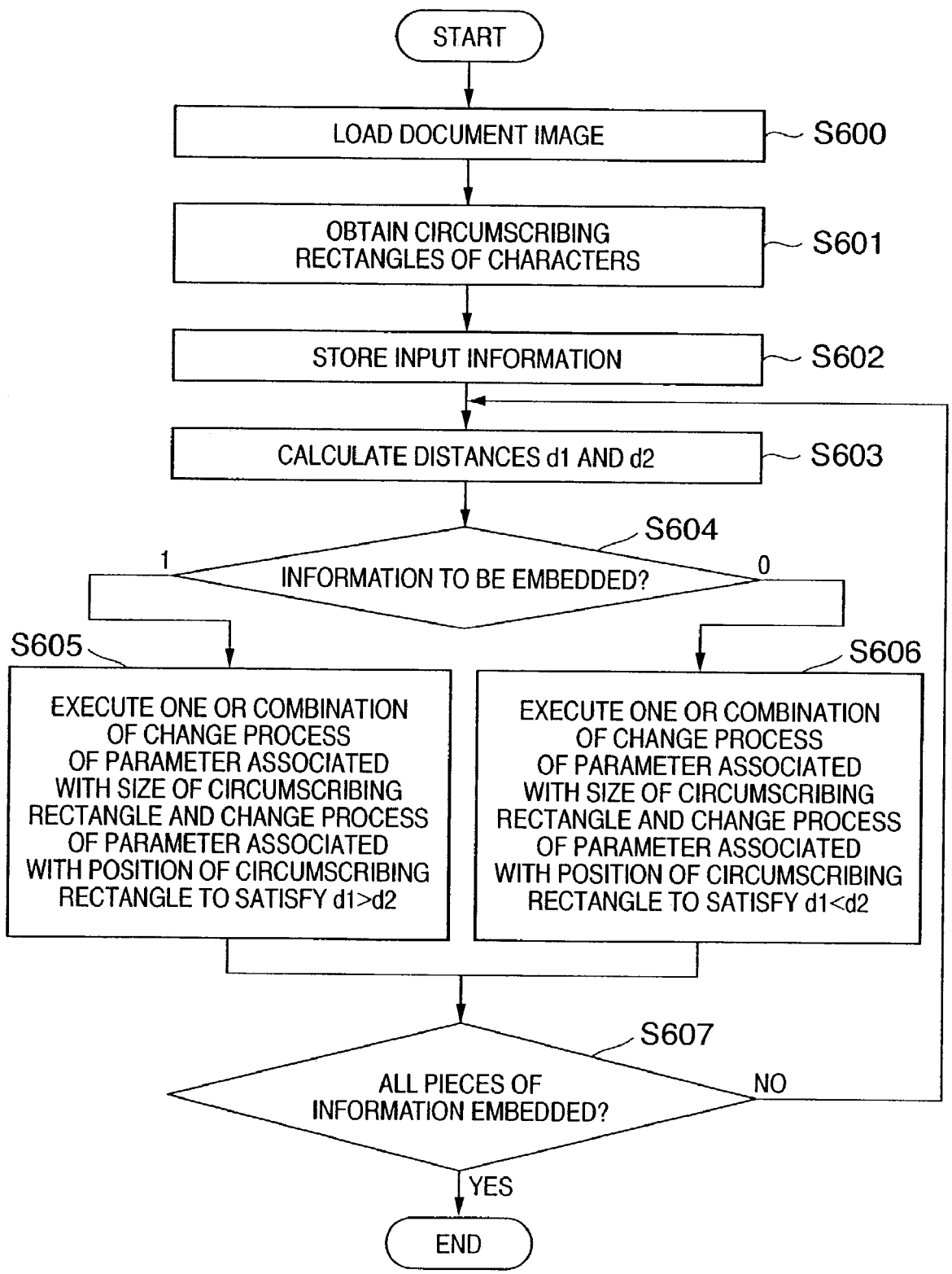
FIG. 6 is a flow chart showing a digital watermark information embedding process according to the first embodiment of the present invention.

The digital watermark information embedding process to be executed by the computer with the above arrangement will be described below with reference to FIG. 6 which is the flow chart of that process. In the following description, the distances (201 and 202, and 203 and 204 in the example of FIG. 2) between every other circumscribing rectangles are used. Also, progress of the following processes may be displayed on the monitor 306 as needed.

A document image in which a digital watermark is to be embedded is loaded onto the main memory 303 in response to a user's input instruction using the mouse 313 or keyboard 314 (step S600). Assume that this document image is obtained by scanning a print medium such as a paper sheet on which a document is printed, and converting the scan result into bitmap data.

However, the method of obtaining a document image is not limited to such specific method. For example, document data created by a general document editor or document data which is loaded from the CD-ROM drive 309, DVD-ROM drive 310, or FD drive 311 onto the main memory 303 maybe converted into bitmap data to generate a document image. Also, the apparatus may comprise a network I/F that can connect to a network such as a LAN, Internet, or the like, and may externally receive and obtain a document image via the network. In any of the above cases, a document image is bitmap data.

The document image as bitmap data undergoes the aforementioned document analysis to obtain circumscribing rectangles of characters (step S601). When the user inputs digital watermark information consisting of 1 or 0 using the keyboard 314 or mouse 313, this information is output to the main memory 303 via the I/F 312, and is stored in the main memory 303 (step S602).

Two distances between non-neighboring circumscribing rectangles from the head of the document are obtained as d1 and d2 (step S603). In the example in FIG. 2, the distance 201 is obtained as d1, and the distance 202 is obtained as d2 (step S603). If information to be embedded is 1, the flow advances to step S605 to execute one or a combination of the following two parameter change processes so as to satisfy d1>d2 (step S605)

The size of circumscribing rectangle B in the column direction is increased or the size of circumscribing rectangle C in the column direction is decreased (a change in parameter associated with the size)

The position of circumscribing rectangle C is moved toward the circumscribing rectangle D side or the position of circumscribing rectangle B is moved toward the circumscribing rectangle D side (a change in parameter associated with the position)

An instruction for one or a combination of these two parameter change processes to be executed may be determined in advance or may be input by the user.

On the other hand, if digital watermark information to be embedded is 0, the flow advances to step S606 to execute one or a combination of the following two parameter change processes so as to satisfy d1<d2 (step S606)

The size of circumscribing rectangle B in the column direction is decreased or the size of circumscribing rectangle C in the column direction is increased (a change in parameter associated with the size).

The position of circumscribing rectangle C is moved toward the circumscribing rectangle A side or the position of circumscribing rectangle B is moved toward the circumscribing rectangle A side (a change in parameter associated with the position).

An instruction for one or a combination of these two parameter change processes to be executed may be determined in advance or may be input by the user. Also, upon execution of the control process that changes the position and/or size of the circumscribing rectangle, the position and/or size of a character circumscribed by the circumscribing rectangle are/is similarly changed accordingly.

In the process in step S605 or S606, the parameters are adjusted in advance to obscure the change portion, i.e., to minimize deterioration of the image quality.

Especially, in the example of FIG. 2, since the positions of every third circumscribing rectangles (circumscribing rectangles A, D, and G in FIG. 2) remain unchanged, an information embedding process is executed to minimize deterioration of the image quality in the balance of these three circumscribing rectangles. In this way, a visually natural embedding process can be implemented compared to a case wherein "only" the space between circumscribing rectangles is changed.

Referring back to FIG. 6, if digital watermark information to be embedded still remains, the flow returns to step S603 to repeat the above process. For example, if information to be embedded still remains, the distance between circumscribing rectangles D and F is obtained as d1, and the distance between circumscribing rectangles E and G is obtained as d2 in the example of FIG. 2. Then, the aforementioned process is repeated by replacing circumscribing rectangles A, B, C, and D in the above description of the embedding process by circumscribing rectangles D, E, F, and G.

With the above process, digital watermark information can be embedded in the document image.

Figure 7:
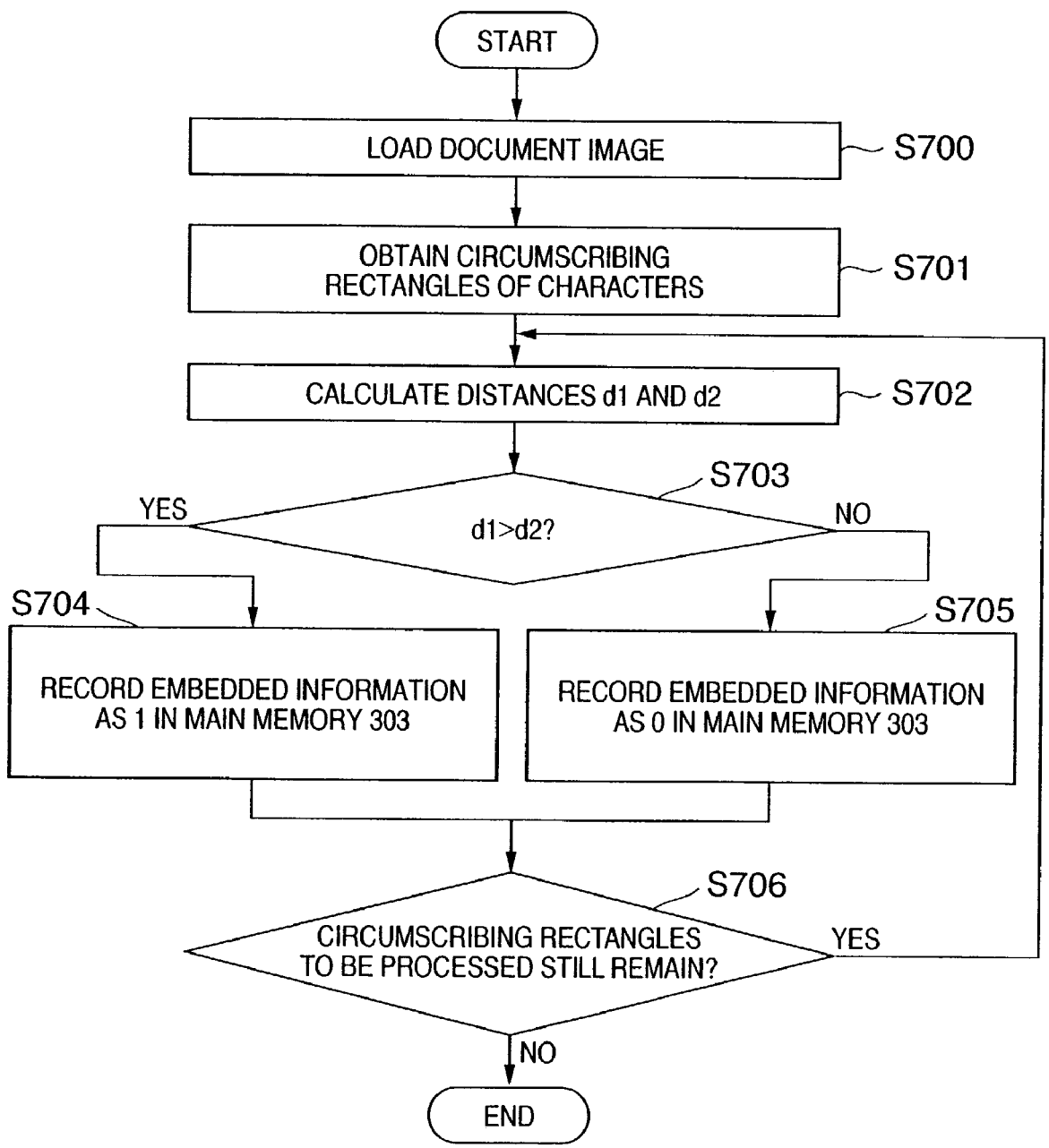
FIG. 7 is a flow chart showing a digital watermark information extraction process according to the first embodiment of the present invention.

A method of extracting digital watermark information embedded by the aforementioned process will be described below. As described above, the digital watermark information extraction process is also executed by the computer shown in FIG. 3. FIG. 7 is a flow chart showing the process to be executed by the computer to extract digital watermark information embedded by the aforementioned process.

A document image embedded with digital watermark information (to be referred to as a watermarked image hereinafter) is loaded onto the main memory 303 in response to a user's input instruction using the mouse 313 or keyboard 314 (step S700). Assume that this watermarked image is obtained by scanning a print medium such as a paper sheet on which a watermarked image generated by the above embedding process is printed, and converting the scan result into bitmap data. However, the method of obtaining a watermarked image is not limited to such specific method. For example, the watermarked image may be loaded from the HDD 304, CD-ROM drive 309, DVD-ROM drive 310, or FD drive 311 onto the main memory 303. Also, the apparatus may comprise a network I/F that can connect to a network such as a LAN, Internet, or the like, and may externally receive and obtain the watermarked image via the network.

The watermarked image undergoes the aforementioned document analysis to obtain circumscribing rectangles of characters (step S701). The process in this step is the same as the processing contents of step S601.

The distances 201 and 202 are obtained as d1 and d2 (step S702). If d1>d2 (step S703), the flow advances to step S704 to record embedded information as 1 in the main memory 303 (step S704). On the other hand, if d1<d2, the flow advances to step S705 to record embedded information as 0 in the main memory 303 (step S705).

It is then checked if circumscribing rectangles to be processed still remain (step S706). In the example of FIG. 2, since circumscribing rectangles E, F, and G still remain after circumscribing rectangles A, B, C, and D, the flow returns to step S702 to obtain the distance between circumscribing rectangles D and F as d1, and the distance between circumscribing rectangles E and G as d2. Then, the aforementioned process is repeated by replacing circumscribing rectangles A, B, C, and D in the above description of the extraction process by circumscribing rectangles D, E, F, and G. If the number of pieces of digital watermark information is known in advance, it may be checked if the number of pieces of digital watermark information recorded in the main memory 303 is equal to that value.

If it is determined in step S706 that no circumscribing rectangle to be processed remains, information recorded in the main memory 303 in steps S704 and S705 can be obtained as digital watermark information. With the above process, digital watermark information can be extracted from a document image in which the digital watermark information is embedded by the aforementioned method.

In the above description, after digital watermark information is embedded in accordance with the comparison result between the distance between circumscribing rectangles A and C, and the distance between circumscribing rectangles B and D, another digital watermark information is embedded in accordance with the comparison result between the distance between circumscribing rectangles D and F, and the distance between circumscribing rectangles E and G. However, the distances to be compared are not limited to these specific distances. That is, after digital watermark information is embedded in accordance with the comparison result between the distance between circumscribing rectangles A and C, and the distance between circumscribing rectangles D and F, another digital watermark information may be embedded in accordance with the comparison result between the distance between circumscribing rectangles B and D, and the distance between circumscribing rectangles E and G.

Also, a pseudo random number may be generated using an arbitrary value as an initial value, and the distances to be compared may be selected in accordance with the random number value. For example, when the random number value is 1, digital watermark information may be embedded in accordance with the comparison result between the distance between circumscribing rectangles A and C, and the distance between circumscribing rectangles B and D, and another digital watermark information may then be embedded in accordance with the comparison result between the distance between circumscribing rectangles D and F, and the distance between circumscribing rectangles E and G. When the random number value is 2, digital watermark information may be embedded in accordance with the comparison result between the distance between circumscribing rectangles A and C, and the distance between circumscribing rectangles D and F, and another digital watermark information may then be embedded in accordance with the comparison result between the distance between circumscribing rectangles B and D, and the distance between circumscribing rectangles E and G.

In this embodiment, the digital watermark information embedding method using an example of a combination of four distances has been explained. When the number of circumscribing rectangles further increases, the number of combinations of the comparison results between the distances of circumscribing rectangles to be used becomes huge. Hence, when the method of selecting the distances to be compared using the random number is used, if the embedding and extraction sides share the initial value as a key, no third party can extract embedded information even when the algorithm is open to the public, thus improving security.

In the above description, every other circumscribing rectangles are used as non-neighboring rectangles. However, the above digital watermark embedding method and extraction method are not limited to every other circumscribing rectangles.

In the above description, if information to be embedded is 1, the parameter process is executed to satisfy d1>d2; if information to be embedded is 0, the parameter process is executed to satisfy d1<d2. However, the present invention is not limited to such specific process, and the inequality sign may be reversed. That is, if information to be embedded is 1, the parameter process may be executed to satisfy d1<d2; if information to be embedded is 0, the parameter process may be executed to satisfy d1>d2. In this case, the extraction process must be modified in correspondence with such change. That is, if d1>d2, embedded information is recorded as 0 in the main memory 303; if d1<d2, embedded information is recorded as 1 in the main memory 303.

[Second Embodiment]

This embodiment embeds digital watermark information in a document image by a method different from the digital watermark information embedding method according to the first embodiment. A method of embedding digital watermark information in a document image, and a method of extracting digital watermark information from this document image according to this embodiment will be described below. Note that the basic arrangement of the computer that implements these embedding and extraction methods, and the functions of the respective blocks are the same as those in the first embodiment.

Figure 1:
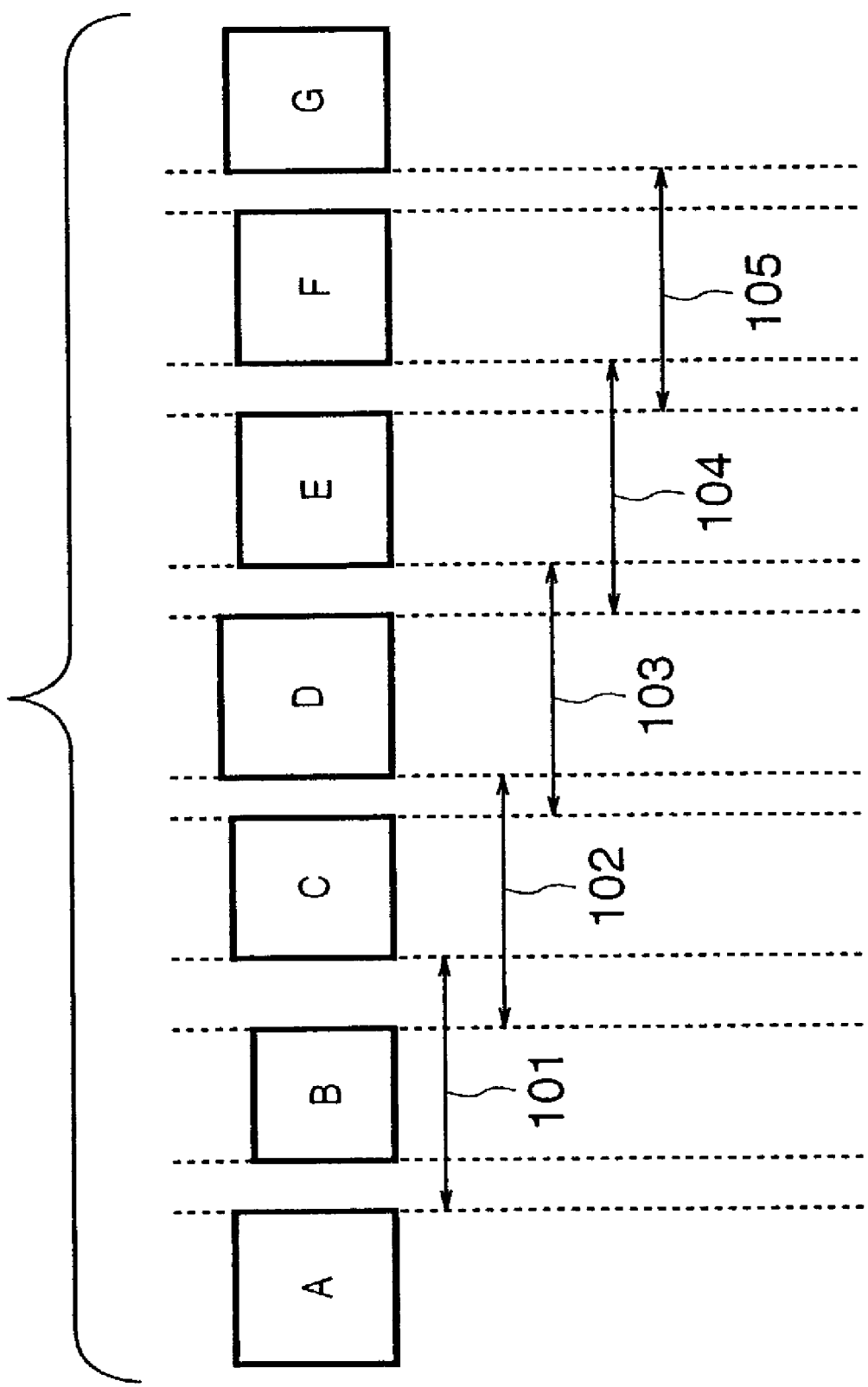
FIG. 1 is a view for explaining a digital watermark information embedding method according to the second embodiment of the present invention, which uses the distances between non-neighboring circumscribing rectangles of respective characters in a document image.

The digital watermark information embedding method according to this embodiment will be described below using FIG. 1. FIG. 1 is a view for explaining a digital watermark information embedding method according to this embodiment, which uses the distances between non-neighboring circumscribing rectangles of respective characters in a document image.

Rectangles A to G indicate circumscribing rectangles of characters which form one line, and are obtained by the process explained in the first embodiment. In FIG. 1, reference numeral 101 denotes a distance between circumscribing rectangles A and C; 102, a distance between circumscribing rectangles B and D; 103, a distance between circumscribing rectangles C and E; 104, a distance between circumscribing rectangles D and F; and 105, a distance between circumscribing rectangles E and G. As described above, the digital watermark information embedding method according to this embodiment changes these distances in accordance with digital watermark information to be embedded.

Figure 4:
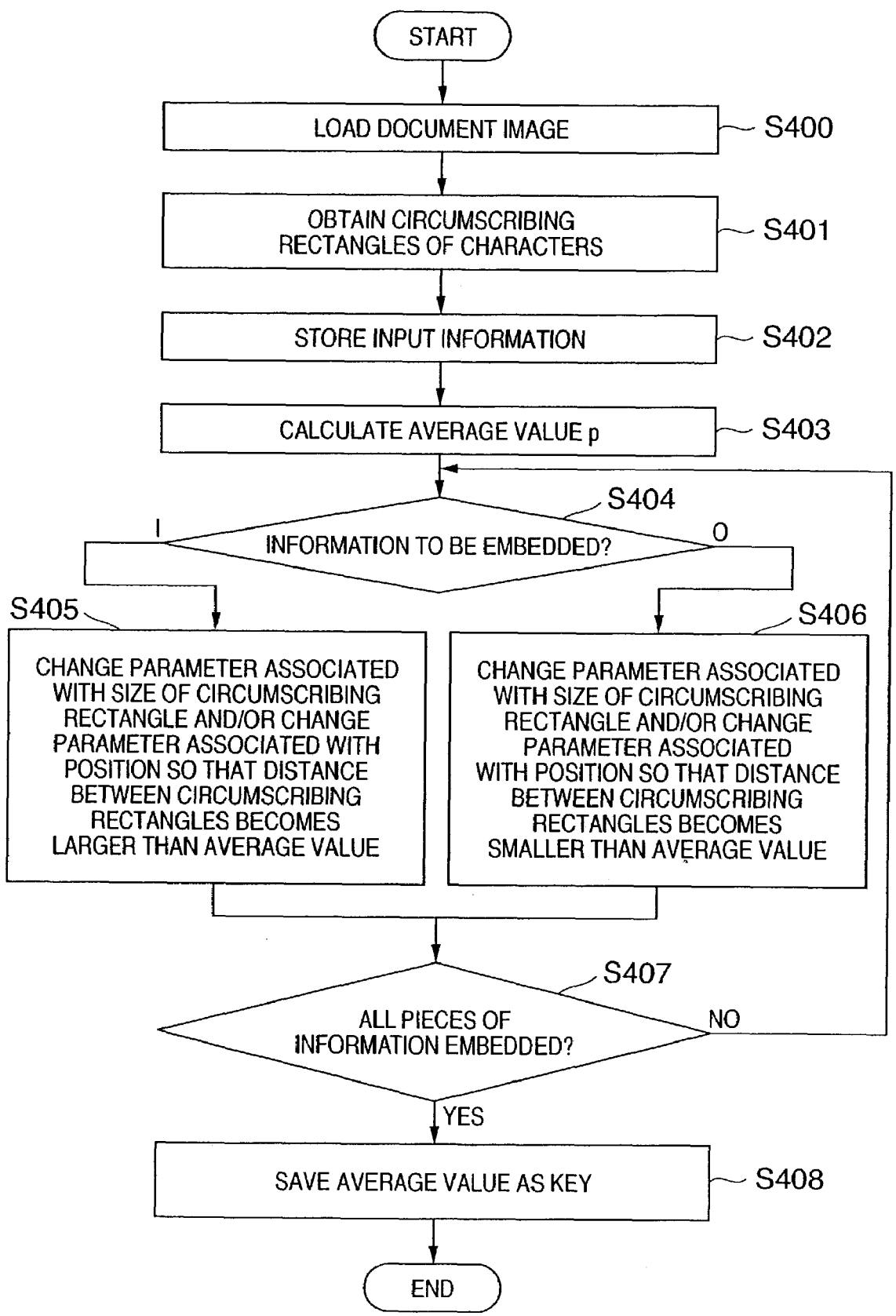
FIG. 4 is a flow chart showing a digital watermark information embedding process according to the second embodiment of the present invention.

The digital watermark information embedding process according to this embodiment to be executed by the computer will be described below with reference to FIG. 4 which is the flow chart of that process. In the following description, the distances (101 to 105 in the example of FIG. 1) between every other circumscribing rectangles are used. Also, progress of the following processes may be displayed on the monitor 306 as needed.

Since the processes in steps S400 to S402 are the same as those in steps S600 to S602, a description thereof will be omitted.

The sum total of the distances between respective circumscribing rectangles in one-line text, i.e., the distances 101 to 105, is calculated, and average value p is calculated (step S403). More specifically, let x1, x2, x3, x4, and x5 be the distances 101 to 105. Then, average value p is calculated by:

$$p=(x1+x2+x3+x4+x5)/5$$

If information to be embedded is 1, a parameter associated with the size of a circumscribing rectangle and/or a parameter associated with the position of a circumscribing rectangle are/is changed so that the distance between circumscribing rectangles becomes larger than the average value (step S405). For example, if the distance 101 is to be controlled, and information to be embedded is 1, one or a combination of:

a process for decreasing the size of circumscribing rectangle C in the column direction (a change in parameter associated with the size); and a process for moving the position of circumscribing rectangle C toward the circumscribing rectangle D side (a change in parameter associated with the position) are executed. Note that an instruction for one or a combination of processes to be executed may be determined in advance or may be input by the user.

On the other hand, if information to be embedded is 0, a parameter associated with the size of a circumscribing rectangle and/or a parameter associated with the position of a circumscribing rectangle are/is changed so that the distance between circumscribing rectangles becomes smaller than the average value (step S406). For example, if the distance 101 is to be controlled, and information to be embedded is 0, one or a combination of:

a process for increasing the size of circumscribing rectangle C in the column direction (a change in parameter associated with the size); and a process for moving the position of circumscribing rectangle C toward the circumscribing rectangle B side (a change in parameter associated with the position) are executed. Note that an instruction for one or a combination of processes to be executed may be determined in advance or may be input by the user. Also, upon execution of the control process that changes the position and/or size of the circumscribing rectangle, the position and/or size of a character circumscribed by the circumscribing rectangle are/is similarly changed accordingly. In the process in step S405 or S406, the parameters are adjusted in advance to obscure the change portion, i.e., to minimize deterioration of the image quality.

If information to be embedded still remains, the flow returns to step S404 to repeat the above process. For example, if information to be embedded still remains, the above process is repeated while selecting the distance 102 as an object to be controlled in the example in FIG. 1.

With the above process, digital watermark information can be embedded in the document image. When information to be embedded still remains after the embedding process for one line, the same process is repeated in the next line.

Finally, the average value is saved in the HDD 304 as a key (step S408). When the embedding process is executed across a plurality of lines, if the average value of the distances between non-neighboring circumscribing rectangles for a plurality lines (e.g., for all lines which are to undergo the embedding process, for each paragraph, or the like) is used as a key, the number of keys to be saved can be decreased.

Figure 5:
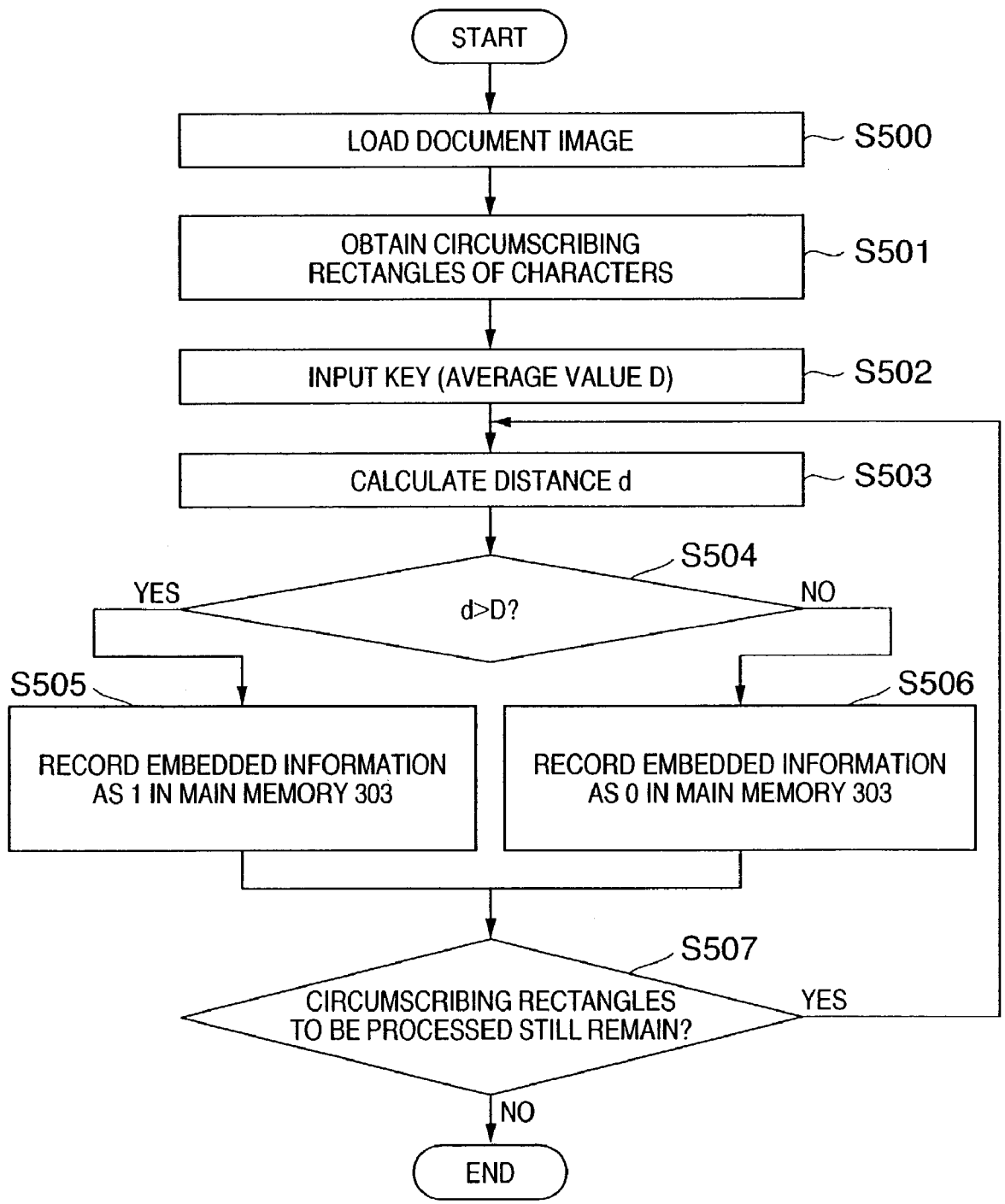
FIG. 5 is a flow chart showing a digital watermark information extraction process according to the second embodiment of the present invention.

A method of extracting digital watermark information embedded by the aforementioned process will be described below. As described above, the digital watermark information extraction process is also executed by the computer shown in FIG. 3. FIG. 5 is a flow chart showing the process to be executed by the computer to extract digital watermark information embedded by the aforementioned process.

Since the processes in steps S500 and S501 are the same as those in steps S700 and S701, a description thereof will be omitted. In step S502, average value D which is saved in the HDD 304 as a key in step S408 is loaded onto the main memory 303 (step S502). Then, distance d between non-neighboring circumscribing rectangles is obtained (step S503). As distance d, d=distance 101 is selected in the example of FIG. 1.

If d>D, the flow advances to step S505 to record embedded information as 1 in the main memory 303 (step S505). On the other hand, if d<D, the flow advances to step S506 to record embedded information as 0 in the main memory 303 (step S506).

It is then checked if the distances to be processed between circumscribing rectangles still remain (step S507). In the example of FIG. 1, since the distances 102, 103, 104, and 105 still remain after the distance 101, the flow returns to step S503 to repeat the above process while selecting d=distance 102. If the number of pieces of digital watermark information is known in advance, it may be checked if the number of pieces of digital watermark information recorded in the main memory 303 is equal to that value.

If it is determined in step S507 that no distances to be processed between circumscribing rectangles remains, information recorded in the main memory 303 in steps S505 and S506 can be obtained as digital watermark information. With the above process, digital watermark information can be extracted from a document image in which the digital watermark information is embedded by the aforementioned method.

The digital watermark information embedding method according to this embodiment can embed a larger information volume than that according to the first embodiment upon embedding digital watermark information in a document image with the same number of characters. This is because the method according to the first embodiment embeds one piece of information (1-bit information in the above description) using four circumscribing rectangles, while the method of the second embodiment can embed one piece of information using two circumscribing rectangles.

However, when the entire document image is enlarged or reduced in size, the embedding method according to this embodiment may disable extraction of information, since it uses comparison with a fixed value, i.e., the average value in place of relative comparison of distances unlike in the embedding method of the first embodiment. However, when an information sequence upon embedding is random, i.e., 1 and 0 have equivalent probabilities of occurrence, since the average value upon embedding equals that upon extraction, the average value may be re-calculated by executing the same process as in step S403 again in step S502 without saving the average value used in embedding as a key in step S408.

Randomization of an information sequence can be easily implemented by an encryption process of information to be embedded. In order to absorb offsets of the probabilities of occurrence of 1 and 0 in the information sequence to be embedded, several circumscribing rectangles at the end of one line may be used to correct such offset in place of using all circumscribing rectangles in the line. When the number of pieces of information=1 as information to be embedded in one line is very large, the length of this line becomes considerably larger than the average value of the lengths of all lines, and this line stands out.

In such case, a predetermined number of "1"s (the maximum number of "1"s at which it is hardly recognized that the length of one line becomes larger than the average value upon embedding "1"s in the line) are embedded in place of embedding "1"s in all gaps between circumscribing rectangles in that line, and "0"s are embedded in the remaining gaps between circumscribing rectangles. The reason why "0"s are embedded is to correct to decrease the length of one line which increases since many "1"s are embedded.

For example, upon embedding information consisting of eight "1"s in six gaps between circumscribing rectangles, "1"s are embedded in four gaps between circumscribing rectangles from the head of a line, and "0"s are embedded in the last two gaps between circumscribing rectangles. Then, the remaining two "1"s are embedded in the next line. In this way, when information consisting of a large number of "1"s is to be embedded, the length of one line can be prevented from being excessively increased.

Conversely, when the number of pieces information=0 is very large as information to be embedded in one line, the length of this line becomes considerably smaller than the average value, and this line stands out. Hence, by executing the aforementioned process while replacing 1 by 0 and 0 by 1, the length of one line can be prevented from being excessively decreased upon embedding information including many "0"s.

In the above description, every other circumscribing rectangles are used as non-neighboring rectangles. However, the above digital watermark embedding method and extraction method are not limited to every other circumscribing rectangles.

In the above description, if information to be embedded is 1, the parameter process is executed to satisfy d>D; if information to be embedded is 0, the parameter process is executed to satisfy d<D. However, the present invention is not limited to such specific process, and the inequality sign may be reversed. That is, if information to be embedded is 1, the parameter process may be executed to satisfy d<D; if information to be embedded is 0, the parameter process may be executed to satisfy d>D. In this case, the extraction process must be modified in correspondence with such change. That is, if d>D, embedded information is recorded as 0 in the main memory 303; if d<D, embedded information is recorded as 1 in the main memory 303.

[Third Embodiment]

This embodiment embeds digital watermark information in a document image by a method different from the digital watermark information embedding methods according to the above embodiments. A method of embedding digital watermark information in a document image, and a method of extracting digital watermark information from this document image according to this embodiment will be described below. Note that the basic arrangement of the computer that implements these embedding and extraction methods, and the functions of the respective blocks are the same as those in the first embodiment.

Figure 8:
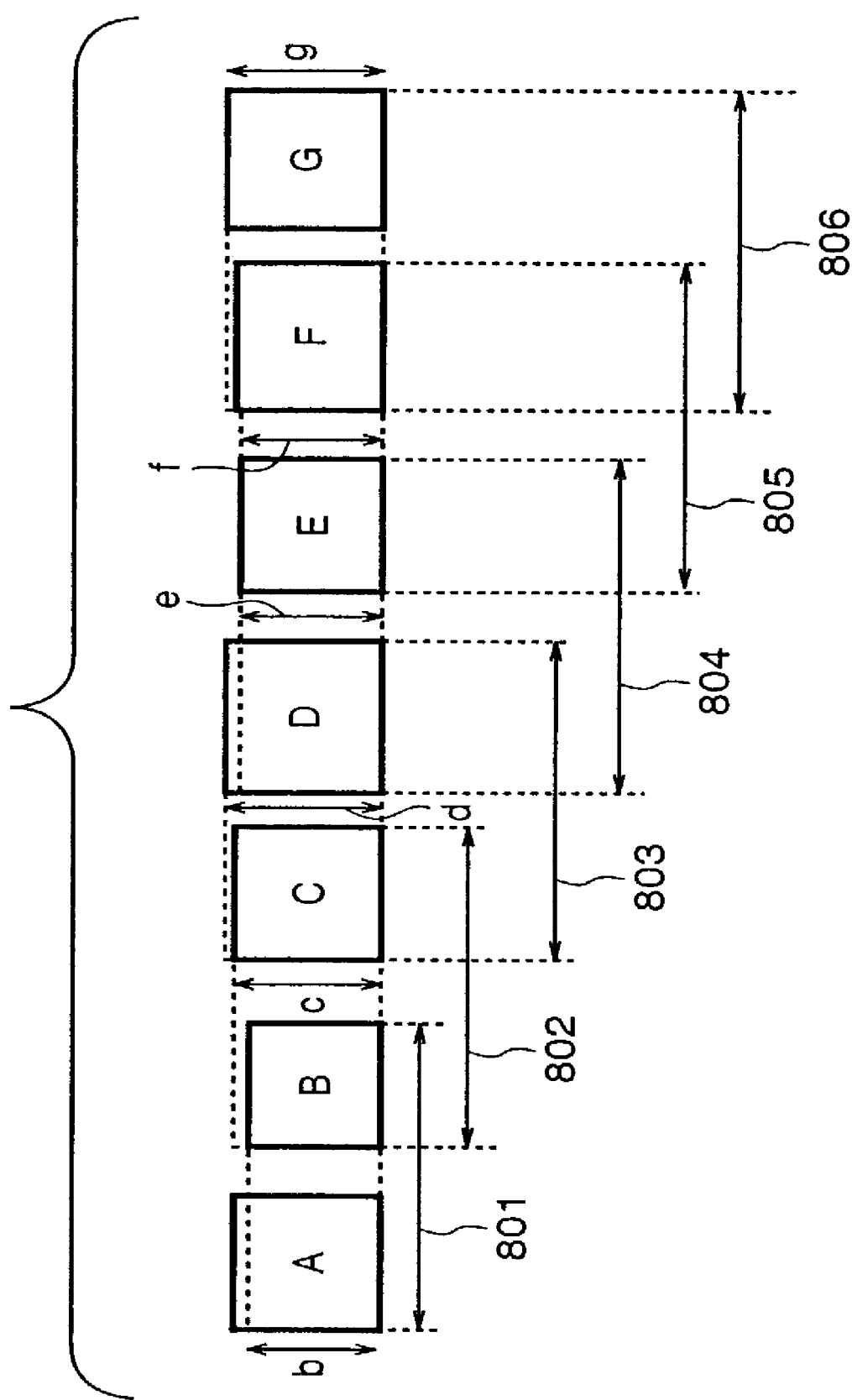
FIG. 8 is a view for explaining a digital watermark information embedding method according to the third embodiment of the present invention, which uses an area defined by the height of one of two neighboring circumscribing rectangles, and the distance between the two circumscribing rectangles in a document image.

The digital watermark information embedding method according to this embodiment will be described below using FIG. 8. FIG. 8 is a view for explaining a digital watermark information embedding method according to this embodiment, which uses an area defined by the height of one of two neighboring circumscribing rectangles, and the distance between the two circumscribing rectangles in a document image.

In FIG. 8, reference numeral 801 denotes a distance between the left edge of circumscribing rectangle A and the right edge of circumscribing rectangle B; 802, a distance between the left edge of circumscribing rectangle B and the right edge of circumscribing rectangle C; 803, a distance between the left edge of circumscribing rectangle C and the right edge of circumscribing rectangle D; 804, a distance between the left edge of circumscribing rectangle D and the right edge of circumscribing rectangle E; 805, a distance between the left edge of circumscribing rectangle E and the right edge of circumscribing rectangle F; and 806, a distance between the left edge of circumscribing rectangle F and the right edge of circumscribing rectangle G. Also, in FIG. 8, reference symbol b denotes a height of circumscribing rectangle B; c, a height of circumscribing rectangle C; d, a height of circumscribing rectangle D; e, a height of circumscribing rectangle E; f, a height of circumscribing rectangle F; and g, a height of circumscribing rectangle G.

The digital watermark information embedding method according to this embodiment changes the areas (the areas respectively defined by distance 801×b, distance 802×c, distance 803×d, distance 804×e, distance 805×f, and distance 806×g in the example of FIG. 8) of rectangles, each of which is defined by the height of one of a pair of circumscribing rectangles, and the distance between the two circumscribing rectangles, in pairs of circumscribing rectangles (pairs of circumscribing rectangles A and B, B and C, C and D, D and E, E and F, and F and G in the example in FIG. 8), in accordance with information to be embedded. Note that the height used to calculate the area of each pair may use that of either circumscribing rectangle included in that pair. In this embodiment, the number of circumscribing rectangles included per pair is not limited to two.

Figure 9:
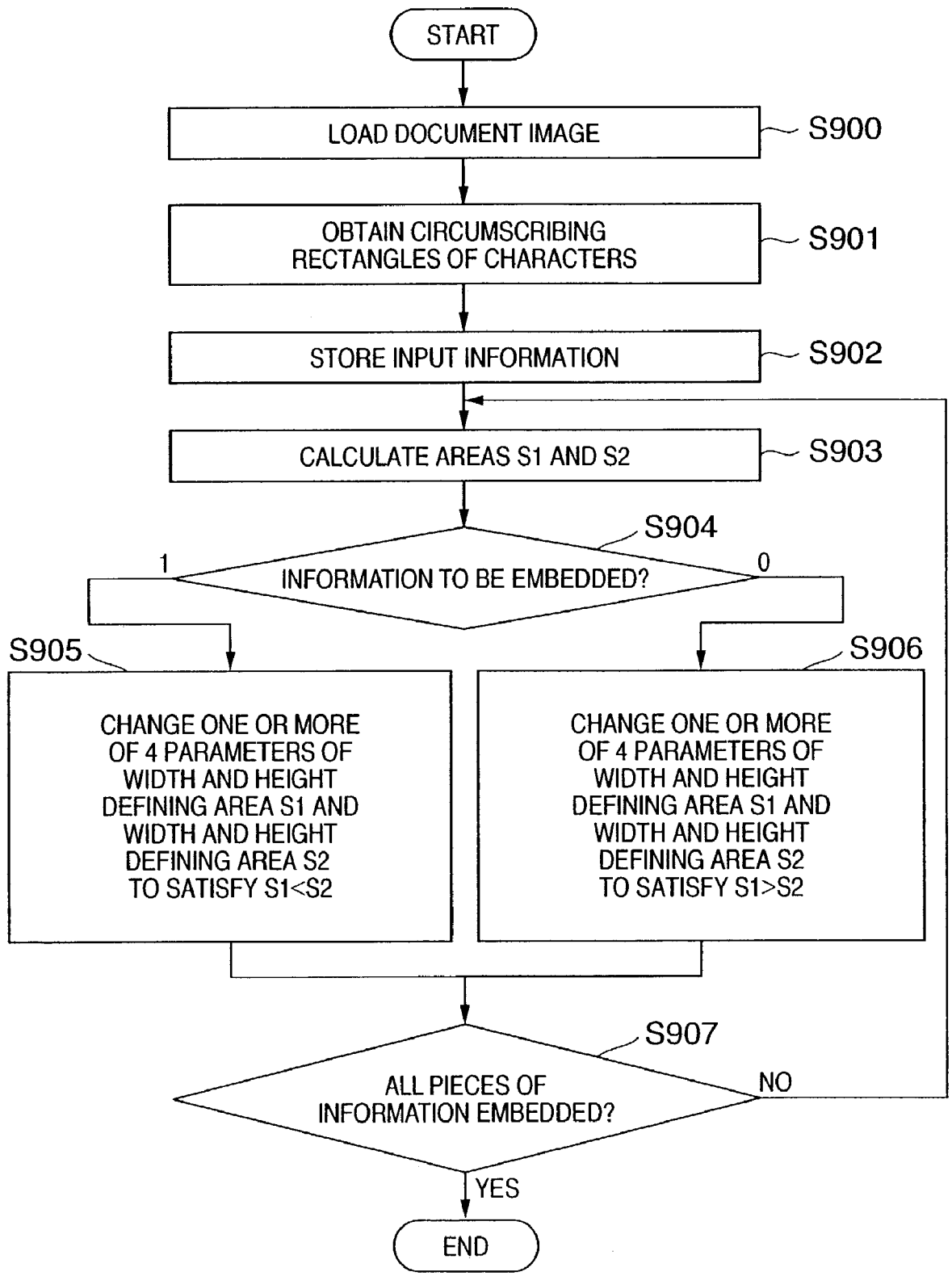
FIG. 9 is a flow chart showing a digital watermark information embedding process according to the third embodiment of the present invention.

The digital watermark information embedding process of this embodiment to be executed by the computer will be described below with reference to FIG. 9 which is the flow chart of that process. Also, progress of the following processes may be displayed on the monitor 306 as needed.

Since the processes in steps S900 to S902 are the same as those in steps S600 to S602, a description thereof will be omitted.

The areas of two pairs from the head of a document are calculated as S1 and S2 (step S903). In the example of FIG. 8, distance 801×b is calculated as S1, and distance 802×c is calculated as S2. If information to be embedded is 1, the flow advances to step S905 to change four parameters, i.e., the width and height which define area S1, and those which define area S2, so as to satisfy S1<S2 (step S905). In the example of FIG. 8, at least one of the four parameters, i.e., height b, distance 801, height c, and distance 802 is changed to satisfy S1<S2.

On the other hand, if information to be embedded is 0, the flow advances to step S906 to change four parameters, i.e., the width and height which define area S1, and those which define area S2, so as to satisfy S1>S2 (step S906). In the example of FIG. 8, at least one of the four parameters, i.e., height b, distance 801, height c, and distance 802 is changed to satisfy S1>S2. Also, upon execution of the control process that changes the position and/or size of the circumscribing rectangle, the position and/or size of a character circumscribed by the circumscribing rectangle are/is similarly changed accordingly.

In the process in step S905 or S906, the parameters are adjusted in advance to obscure the change portion, i.e., to minimize deterioration of the image quality.

If digital watermark information to be embedded still remains, the flow returns to step S903 to repeat the above process. For example, if digital watermark information to be embedded still remains, in the example of FIG. 8 distance 803×d is calculated as S1, and distance 804×e is calculated as S2, thus repeating the aforementioned process.

With the above process, digital watermark information can be embedded in the document image.

Figure 10:
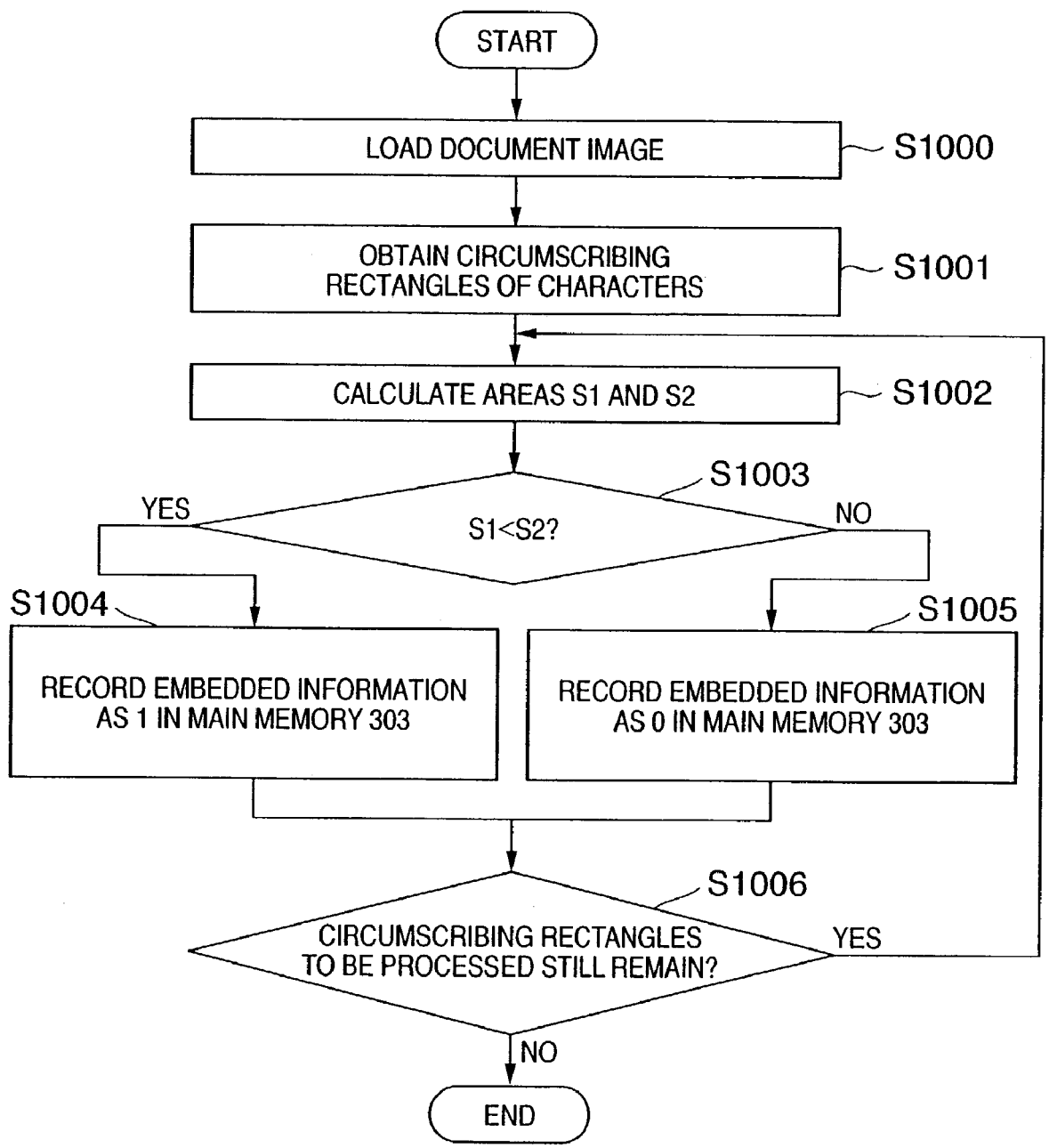
FIG. 10 is a flow chart showing a digital watermark information extraction process according to the third embodiment of the present invention.

A method of extracting digital watermark information embedded by the aforementioned process will be described below. As described above, the digital watermark information extraction process is also executed by the computer shown in FIG. 3. FIG. 10 is a flow chart showing the process to be executed by the computer to extract digital watermark information embedded by the aforementioned process.

Since the processes in steps S1000, S1001, and S1002 are the same as those in steps S700, S701, and S903, a description thereof will be omitted.

After S1 and S2 are respectively calculated by distance 801×b and distance 802×c, if S1<S2 (step S1003), the flow advances to step S1004 to record embedded information as 1 in the main memory 303 (step S1004). On the other hand, if S1>S2, the flow advances to step S1005 to record embedded information as 0 in the main memory 303 (step S1005).

It is then checked if circumscribing rectangles to be processed still remain (step S1006). In the example of FIG. 8, S1 and S2 are respectively calculated by distance 803×d and distance 804×e, and the above process is repeated. If the number of pieces of digital watermark information is known in advance, it may be checked if the number of pieces of digital watermark information recorded in the main memory 303 is equal to that value.

If it is determined in step S1006 that no circumscribing rectangle to be processed remains, information recorded in the main memory 303 in steps S1004 and S1005 can be obtained as digital watermark information. With the above process, digital watermark information can be extracted from a document image in which the digital watermark information is embedded by the aforementioned method.

In this embodiment, the areas of rectangles, each of which is defined by two circumscribing rectangles are used as S1 and S2. In addition, S1 and S2 formulated using a plurality of independent parameters that define circumscribing rectangles may be used.

For example, distance 801+b may be calculated as S1, and distance 802+c may be calculated as S2, or distance 801+(b×0.1) may be calculated as S1, and distance 802+(c×0.1) may be calculated as S2. Also, each of the distances 801 to 806 may be defined as a distance from the right edge of the left circumscribing rectangle to the left edge of the right circumscribing rectangle as in the first embodiment in place of the distance from the left edge of the left circumscribing rectangle to the right edge of the right circumscribing rectangle. The pairs of circumscribing rectangles, whose areas are to be compared, may be designated using a key. As another method of embedding information in each area, the average value of all the areas may be calculated, and if information to be embedded is 1, the area to be embedded may be increased; if information to be embedded is 0, the area to be embedded may be decreased, as in the second embodiment.

In the above description, if information to be embedded is 1, the parameter process is executed to satisfy S1<S2; if information to be embedded is 0, the parameter process is executed to satisfy S1>S2. However, the present invention is not limited to such specific process, and the inequality sign may be reversed. That is, if information to be embedded is 1, the parameter process may be executed to satisfy S1>S2; if information to be embedded is 0, the parameter process may be executed to satisfy S1<S2. In this case, the extraction process must be modified in correspondence with such change. That is, if S1<S2, embedded information is recorded as 0 in the main memory 303; if S1>S2, embedded information is recorded as 1 in the main memory 303.

[Fourth Embodiment]

A program that implements the digital watermark embedding method and extraction method of each of the above embodiment may be applied to a printer driver.

[Another Embodiment]

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit. When the present invention is applied to the recording medium, that recording medium stores the program codes corresponding to the aforementioned flow charts.

When the present invention is applied to the recording medium, that recording medium stores program codes corresponding to the aforementioned flow charts.

As described above, according to the present invention, even when digital watermark information is embedded in a document image, deterioration of the image quality of the document image can be suppressed, and a digital watermark can be embedded to be visually imperceptible to a human being.

As many apparently widely different embodiments of the present invention can be made without departing from the spirit and scope thereof, it is to be understood that the invention is not limited to the specific embodiments thereof except as defined in the claims.

What is claimed is:

1. A digital watermark embedding apparatus for embedding digital watermark information in a document image, comprising:

circumscribing rectangle calculation means for calculating circumscribing rectangles of respective characters which form the document image;

distance calculation means for calculating a first distance between circumscribing rectangles in a first pair as a pair of non-neighboring tow circumscribing rectangles in a second pair different from the first pair; and control means for controlling any of characters which form the first or second pair so as to change a comparison result between the first and second distances in accordance with the digital watermark information.

2. The apparatus according to claim 1, wherein said control means controls at least one of a size and position of any of the characters which form the first or second pair.

3. A digital watermark extraction apparatus for extracting digital watermark information from a document image in which the digital watermark information is embedded by a digital watermark embedding apparatus of claim 1, comprising:

circumscribing rectangle calculation means for calculating circumscribing rectangles of respective characters which form the document image;

distance calculation means for calculating a first distance between circumscribing rectangles in a first pair as a pan of non-neighboring two circumscribing rectangles, and a second distance between circumscribing rectangles in a second pair different from the first pair; and extraction means for expressing a comparison result between the first and second distances as a predetermined value, and extracting the value as digital watermark information.

4. A program embodied in a computer-readable medium for making a computer function as a digital watermark extraction apparatus of claim 3.

5. A program embodied in a computer-readable medium for making a computer function as a digital watermark embedding apparatus of claim 1.

6. A digital watermark embedding apparatus for embedding digital watermark information in a document image, comprising:

circumscribing rectangle calculation means for calculating circumscribing rectangles of respective characters which form the document image;

average value calculation means for calculating an average value of distances each between non-neighboring two circumscribing rectangles; and control means controlling at least one character to change the distance between non-neighboring two circumscribing rectangles with respect to the average value in accordance with the digital watermark information.

7. A digital watermark extraction apparatus for extracting digital watermark information from a document image in which the digital watermark information is embedded by a digital watermark embedding apparatus of claim 6, comprising:

circumscribing rectangle calculation means for calculating circumscribing rectangles of respective characters which form the document image; and extraction means for expressing a comparison result between a distance between non-neighboring two circumscribing rectangles and an average value of distances each between non-neighboring two circumscribing rectangles as a predetermined value, and extracting the value as digital watermark information.

8. The apparatus according to claim 7, further comprising average value calculation means for calculating the average value utilized by said extraction means.

9. A digital watermark embedding apparatus for embedding digital watermark information in a document image, comprising:

circumscribing rectangle calculation means for calculating circumscribing rectangles of respective characters which form the document image; and embedding means for embedding digital watermark information using a distance between non-neighboring two circumscribing rectangles, and correcting a change in distance between a predetermined number of circumscribing rectangles, which change takes place upon embedding.

10. The apparatus according to claim 9, wherein said embedding means embeds digital watermark information between a predetermined number of circumscribing rectangles from a head of a line, of circumscribing rectangles which form the line, and embedding information, that gives a change opposite to a changer in distance between circumscribing rectangles that takes place by the digital watermark information, between the remaining circumscribing rectangles.

11. A digital watermark embedding method for embedding digital watermark information in a document image, comprising:

a circumscribing rectangle calculation step of calculating circumscribing rectangles of respective characters which form the document image;

a distance calculation step of calculating a first distance between circumscribing rectangles in a first pair as a pair of non-neighboring two circumscribing rectangles, and a second distance between circumscribing rectangles in a second pair different from the first pair; and a control step of controlling any of characters which form the first or second pair so as to change a comparison result between the first and second distances in accordance with the digital watermark information.

12. A digital watermark extraction method for extracting digital watermark information from a document image in which the digital watermark information is embedded by a digital watermark embedding method of claim 11, comprising:
- a circumscribing rectangle calculation step of calculating circumscribing rectangles of respective characters which form the document image;
- a distance calculation step of calculating a first distance between circumscribing rectangles in a first pari as a pair of non-neighboring two circumscribing rectangles, and a second distance between circumscribing rectangles in a second pair different from the first pair; and.

13. A program embodied in a computer-readable medium for making a computer execute a digital watermark extraction method of claim 12.

14. A program embodied in a computer-readable medium for making a computer execute a digital watermark embedding method of claim 11.

15. A digital watermark embedding method for embedding digital watermark information in a document image, comprising:
- a circumscribing rectangle calculation step of calculating circumscribing rectangles of respective characters which form the document image;
- an average value calculation step of calculating an average value of distances each between non-neighboring two circumscribing rectangles; and
- a control step of controlling at least one character to change the distance between non-neighboring two circumscribing rectangles with respect to the average value in accordance with the digital watermark information.

16. A digital watermark extraction method for extracting digital watermark information is embedded by a digital watermark embedding method of claim 15, comprising:
- a circumscribing rectangle calculation step of calculating circumscribing rectangles of respective characters which form the document image; and
- an extraction step of expressing a comparison result between a distance between non-neighboring two circumscribing rectangles and an average value of distance each between non-neighboring two circumscribing rectangles as a predetermined value, and extracting the value as digital watermark information.

17. The method according to claim 16, further comprising an average value calculation step of calculating the average value utilized in said extraction step.

18. A digital watermark embedding method for embedding digital watermark information in a document image, comprising:
- a circumscribing rectangle calculation step of calculating circumscribing rectangles of respective characters which form the document image; and
- an embedding step of embedding digital watermark information using a distance between non-neighboring two circumscribing rectangles, and correcting a change in distance between a predetermined number of circumscribing rectangles, which change takes place upon embedding.

* * * * *

UNITED STATES PATENT AND TRADEMARK OFFICE
CERTIFICATE OF CORRECTION

PATENT NO. : 7,209,572 B2
APPLICATION NO. : 10/456534
DATED : April 24, 2007
INVENTOR(S) : Keiichi Iwamura et al.

It is certified that error appears in the above-identified patent and that said Letters Patent is hereby corrected as shown below:

| | | |
|---|---|---|
| Cover Page | | (56) References Cited |
| | | "2001/0017709 A1    8/2001    Murakmi et al." should read |
| | | --2001/0017709 A1    8/2001    Murakami et al.--. |
| Col. 5, | line 45, | "maybe" should read --may be--. |
| | line 67, | after "(step S606)" add --.--. |
| Col. 6, | line 4, | "the size)" should read --the size).-- |
| | line 11, | "position)" should read --position).-- |
| | line 16, | after "(step S606)" add --.--. |
| | line 37, | "rectangles" should read --rectangle--. |
| Col. 10, | line 22, | "a plurality lines" should read --a plurality of lines--. |
| Col. 11, | line 43, | "pieces information" should read --pieces of information--. |
| Col. 15, | line 28, | "tow" should read --two--; and after rectangles, add --, and a second distance between circumscribing rectangles--. |
| | line 48, | "pan" should read --pair--. |
| Col. 16, | line 4, | "means controlling" should read --means for controlling--. |
| | line 47, | "a changer" should read --a change--. |
| Col. 17, | line 10, | "first pari" should read --first pair--. |
| | line 13, | after "and" add --an extraction step of expressing a comparison result between the first and second distances as a predetermined value, and extracting the value as digital watermark information.--. |

UNITED STATES PATENT AND TRADEMARK OFFICE
CERTIFICATE OF CORRECTION

PATENT NO.       : 7,209,572 B2
APPLICATION NO.  : 10/456534
DATED            : April 24, 2007
INVENTOR(S)      : Keiichi Iwamura et al.

It is certified that error appears in the above-identified patent and that said Letters Patent is hereby corrected as shown below:

Col. 18,   line 2,    after "information" add --from a document image in which the digital watermark information is--.

line 12,   "tance" should read --tances--.

Signed and Sealed this

Twelfth Day of August, 2008

JON W. DUDAS
*Director of the United States Patent and Trademark Office*